Figure 1:
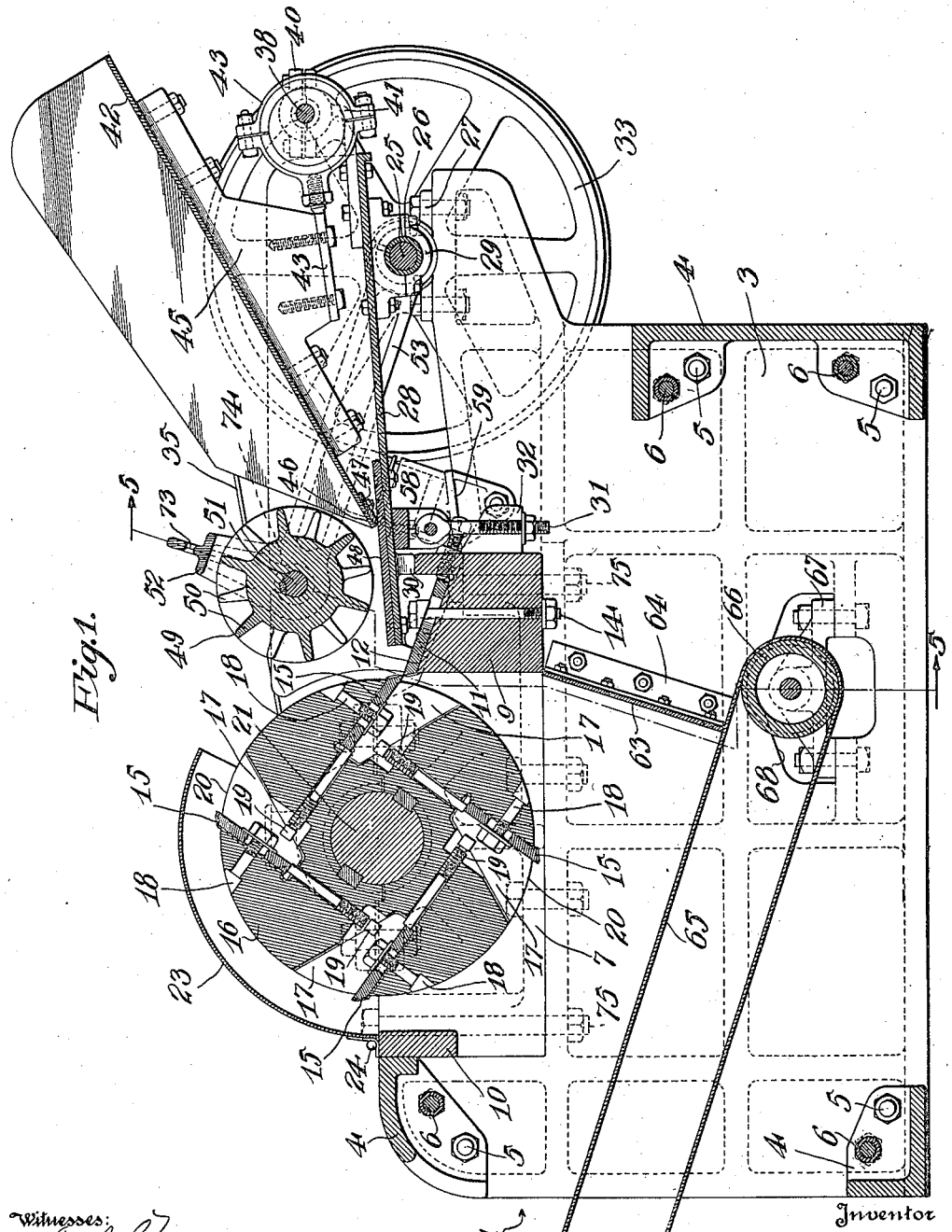

Nov. 11, 1924.

J. B. WHITE

STOCK CUTTER

Filed Jan. 2, 1924

1,515,377

8 Sheets-Sheet 1

Witnesses:

Inventor
James B. White
By Joshua R. H. Potts
his Attorney

Nov. 11, 1924.

J. B. WHITE

STOCK CUTTER

Filed Jan. 2, 1924

1,515,377

8 Sheets-Sheet 2

Witnesses:
Virgil L. Maret
George A. Gruss

Inventor
James B. White
By Joshua R. H. Potts
Attorney

Nov. 11, 1924.

J. B. WHITE

STOCK CUTTER

Filed Jan. 2, 1924

1,515,377

8 Sheets—Sheet 4

Witnesses:
Virgil R. Marrs
George A. Grues

Inventor
James B. White
By Joshua R. H. Potts
his Attorney

Nov. 11, 1924.
J. B. WHITE
STOCK CUTTER
Filed Jan. 2, 1924
1,515,377
8 Sheets—Sheet 5
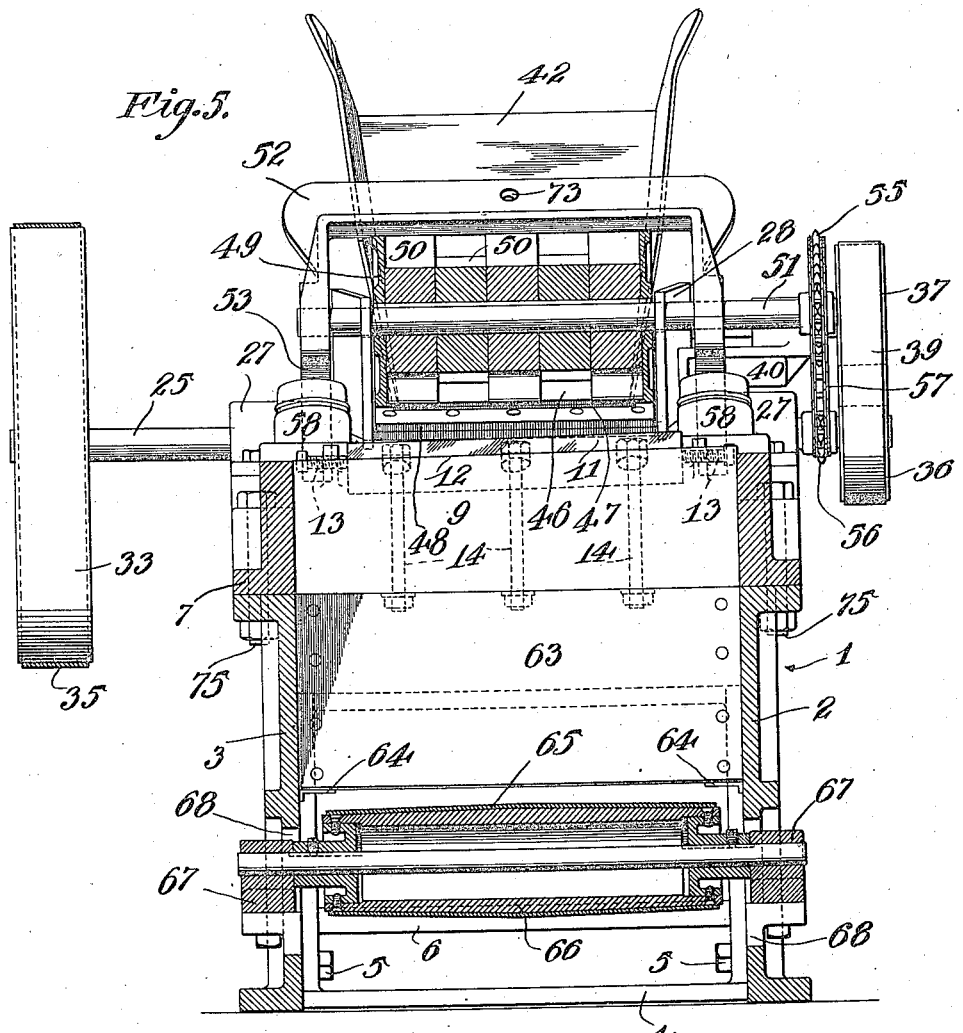
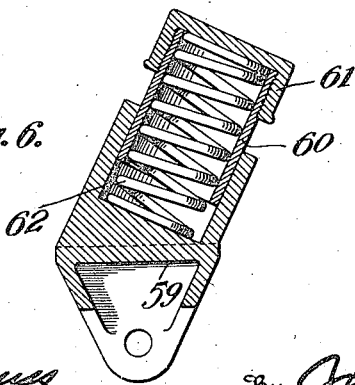
Witnesses:
Virgil L. Mares
George A. Gress
Inventor
James B. White
By Joshua R. H. Toth
his Attorney

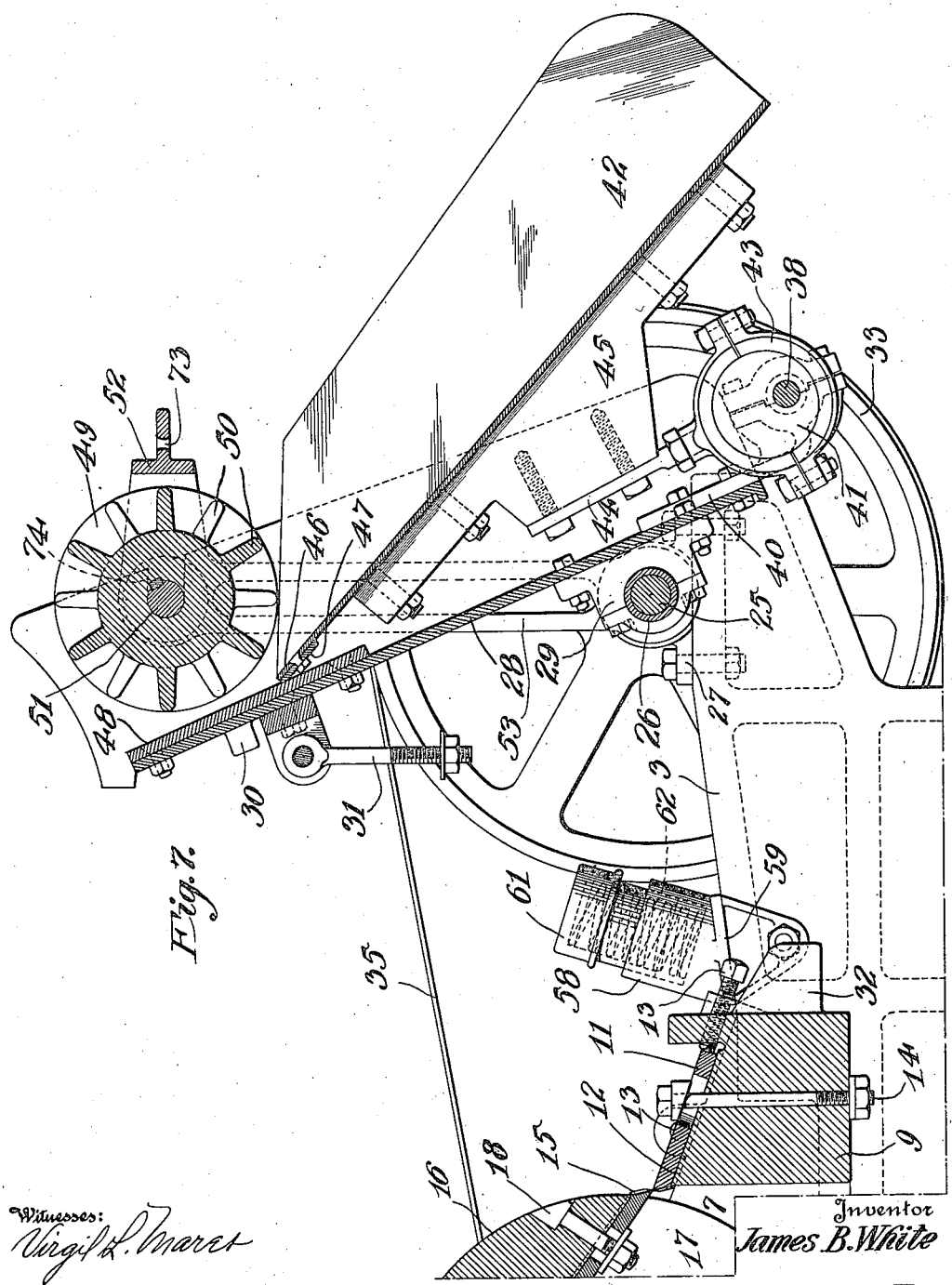

Nov. 11, 1924.
1,515,377
J. B. WHITE
STOCK CUTTER
Filed Jan. 2, 1924    8 Sheets-Sheet 7
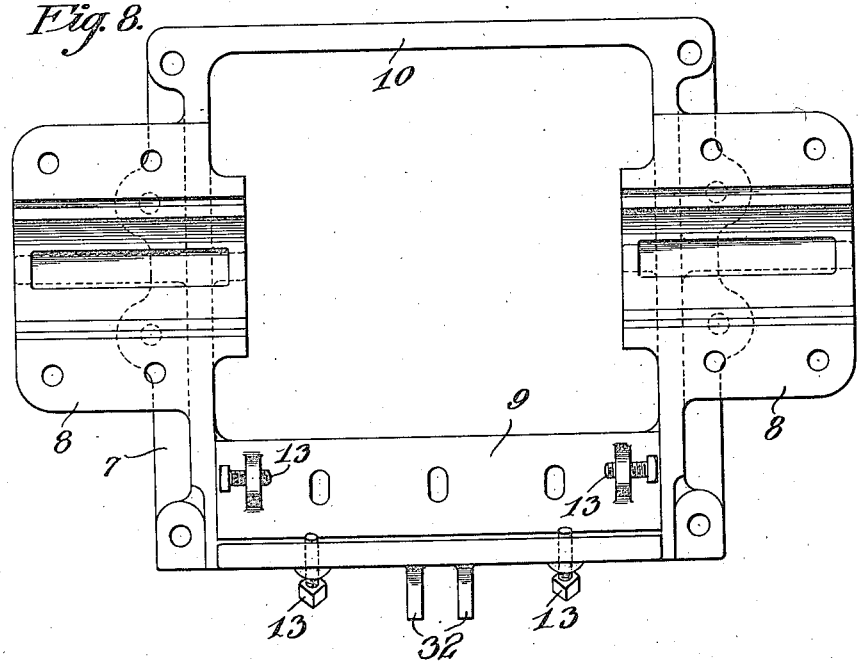
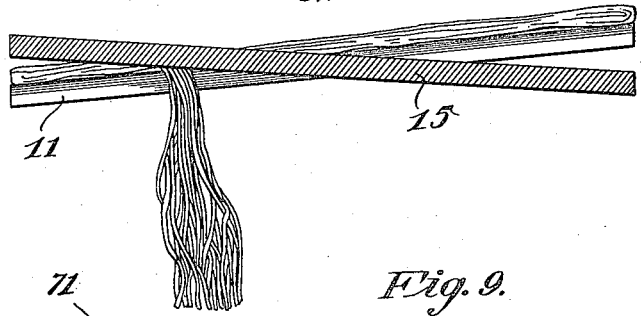
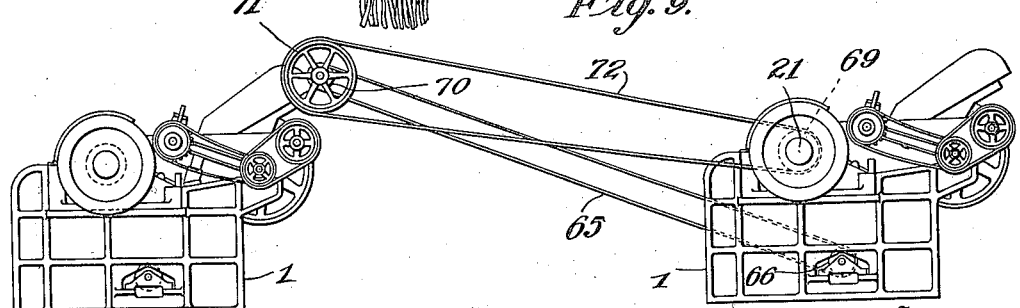
Witnesses:
Virgil L. Maret
George A. Grues
Inventor
James B. White
By Joshua R. H. Potts
his Attorney Nov. 11, 1924.

J. B. WHITE

STOCK CUTTER

Filed Jan. 2, 1924

1,515,377

8 Sheets—Sheet 8

Inventor
James B. White

Witnesses:
Virgil L. Marek
George A. Gruse

By Joshua R. H. Potts
his Attorney

Patented Nov. 11, 1924.

1,515,377

UNITED STATES PATENT OFFICE.

JAMES BERTWELL WHITE, OF YORKLYN, DELAWARE.

STOCK CUTTER.

Application filed January 2, 1924. Serial No. 684,002.

*To all whom it may concern:*

Be it known that I, JAMES B. WHITE, a citizen of the United States, residing at Yorklyn, in the county of New Castle and State of Delaware, have invented certain new and useful Improvements in Stock Cutters, of which the following is a specification.

My invention relates to stock cutters adapted for use in cutting rags or other paper stock, glue stock, rubber scrap, etc.

Heretofore, cutters of this type produced quantities of dust; caused fire by the frictional engagement of loose stock with the rotating parts; required constant attention of an operator; caused severe strains on the knives; were subject to distortion from the strains, thereby causing the parts to get out of alignment, and cut the stock into various sizes, thereby requiring the cut stock to be passed through other cutters to be cut to the proper fineness.

The objects of my invention are to provide a cutter which will shear the stock so that no two points on the knives will cut at the same time, thereby reducing the dust to the minimum, eliminating the severe strains on the knives and permitting maximum speed of the machine; to provide feeding means which will automatically feed the stock between the knives; to provide means for guiding the stock and preventing fire by friction; to provide a machine of such design that it is practically impossible for the bearings to get out of alignment, and to provide a machine in which a single set of cutters will cut the stock to any degree of fineness.

These objects, and other advantageous ends which will be described hereinafter, I attain in the following manner, reference being had to the accompanying drawings in which—

Figure 2:
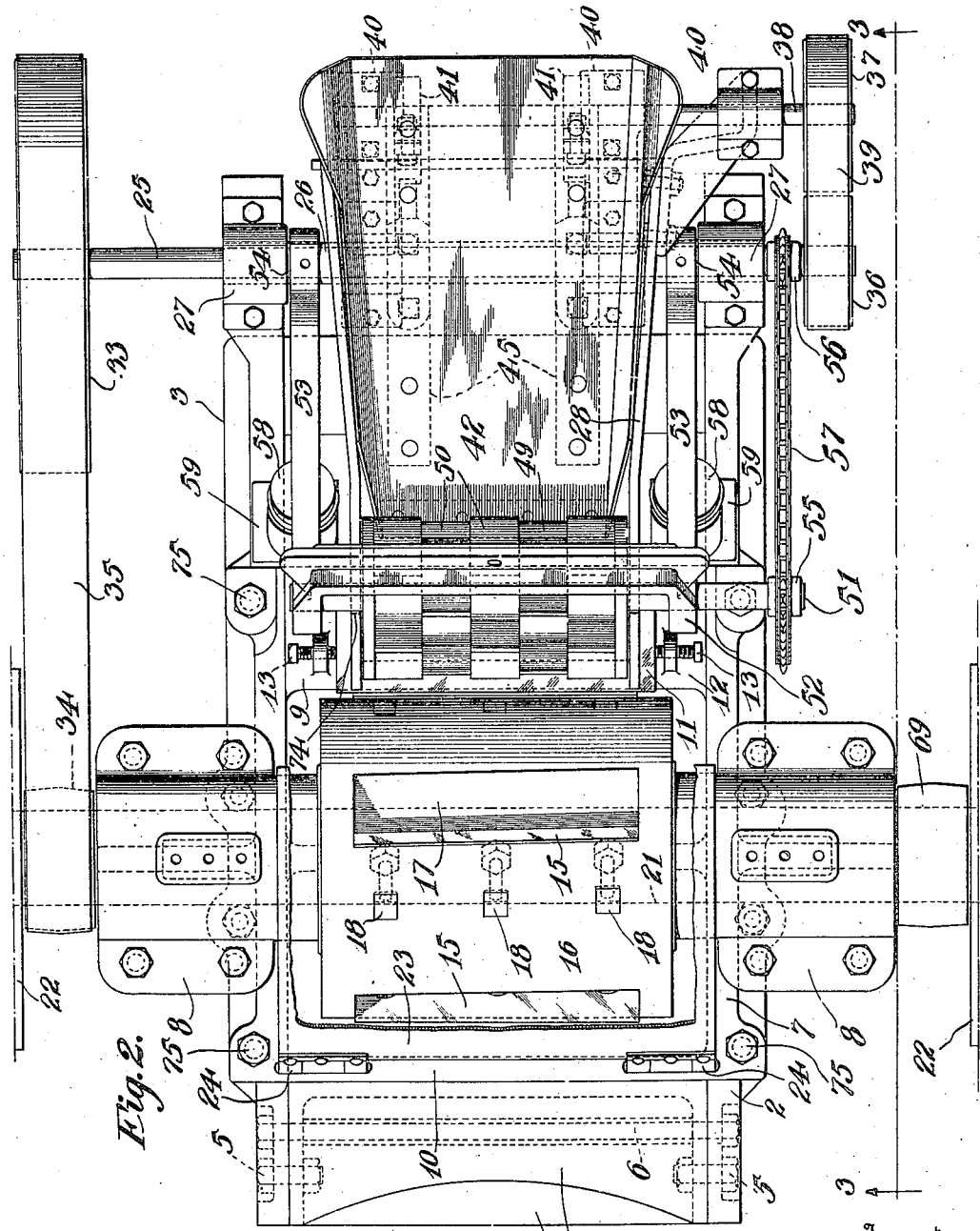
Figure 3:
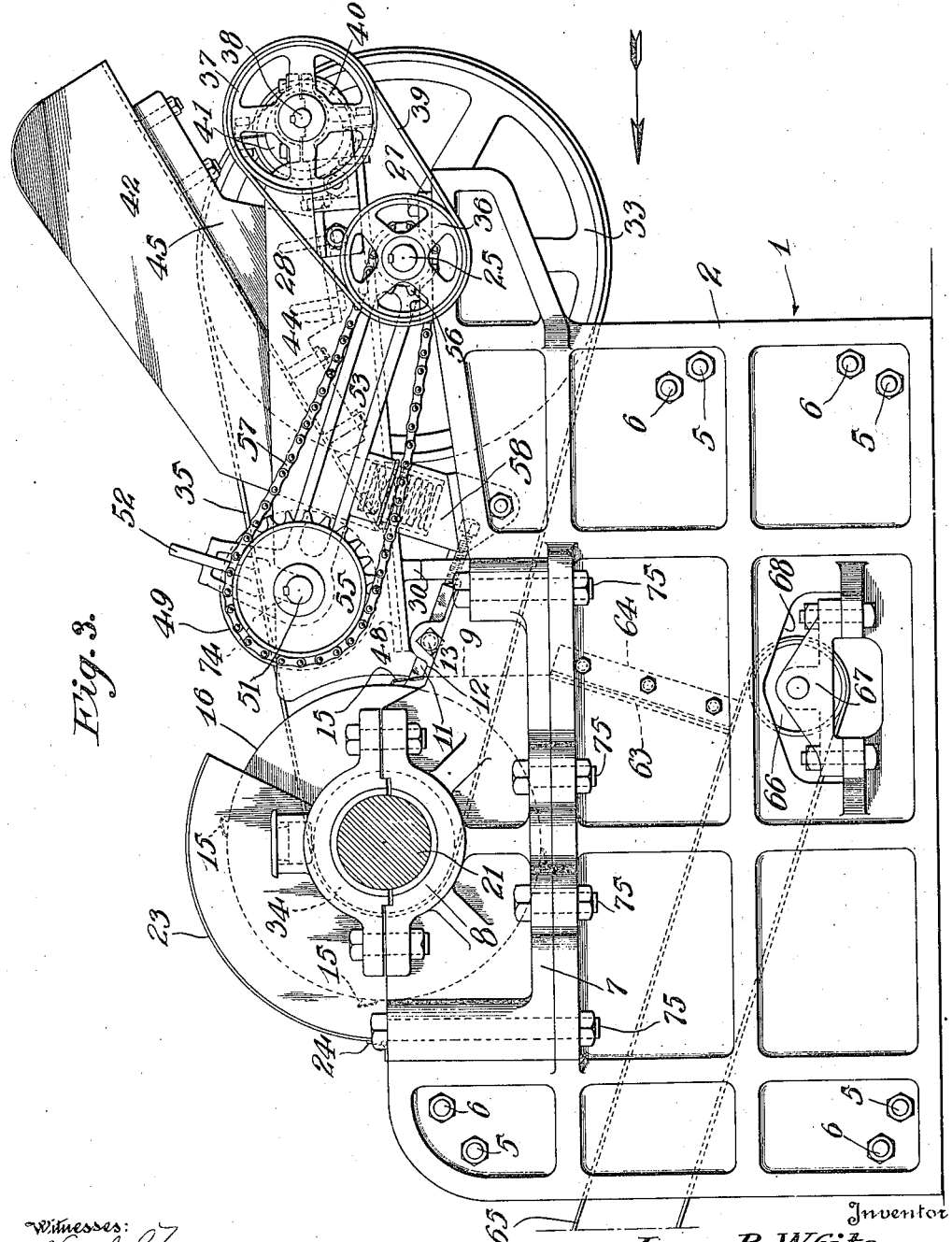
Figure 4:
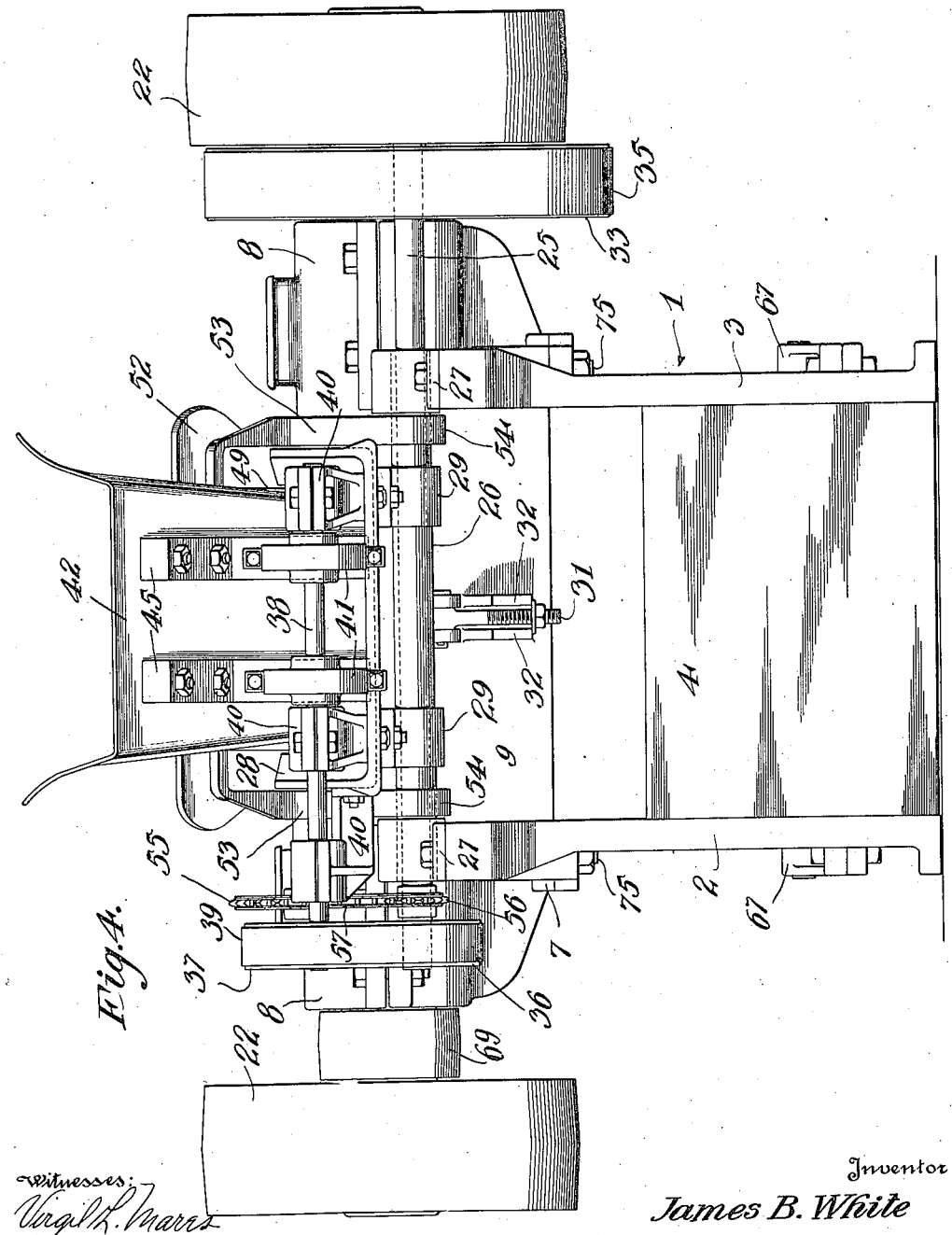
Figure 11:
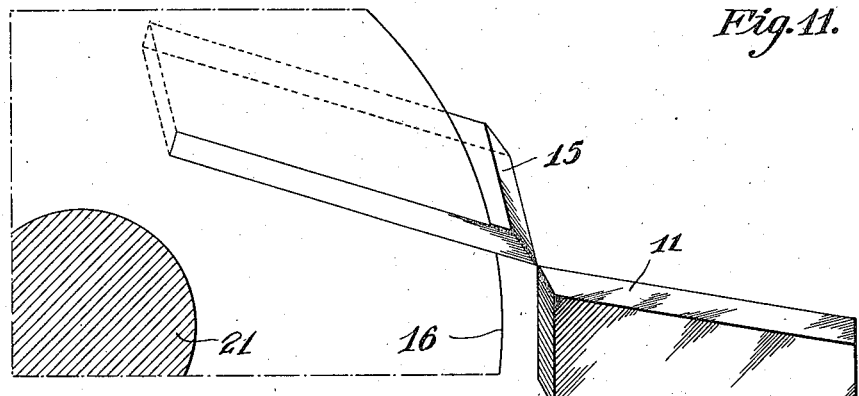
Figure 12:
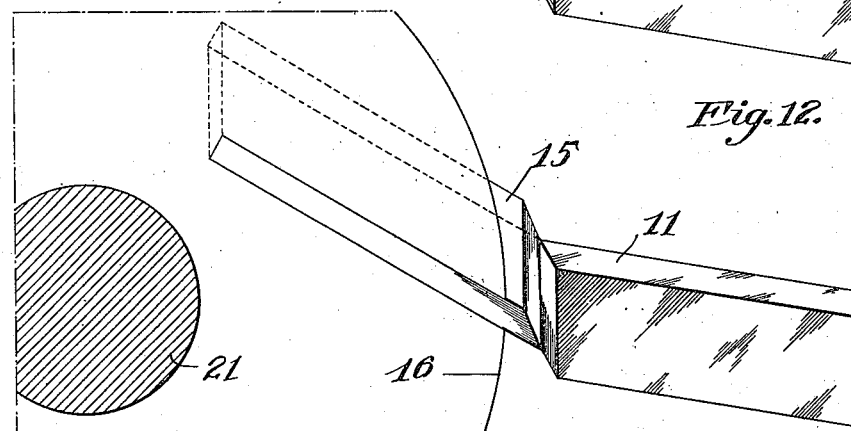
Figure 13:
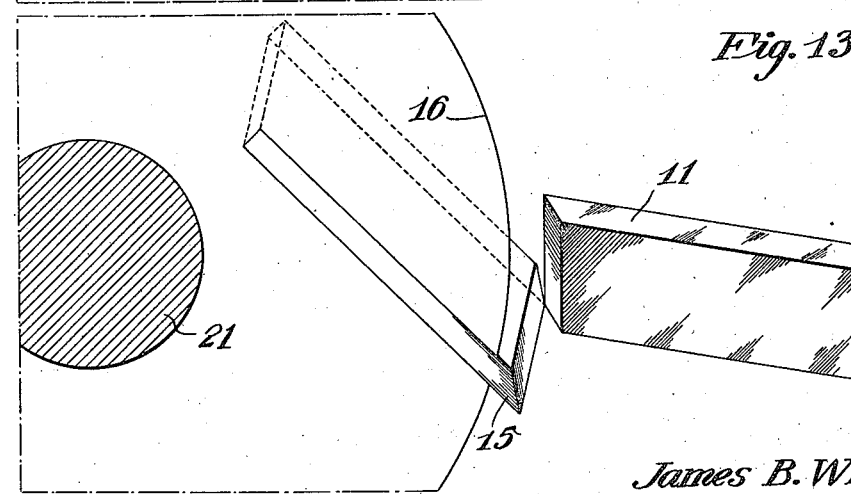

Figure 1 is a central section through a stock cutter constructed in accordance with my invention, Figure 2 a plan view of the stock cutter shown in Figure 1, Figure 3 a section on line 3—3 of Figure 2, Figure 4 an end view of Figure 3, looking in the direction of the arrow, Figure 5 a section on line 5—5 of Figure 1, Figure 6 a central section through the shock-absorbing means shown in Figure 5, Figure 7 an enlarged fragmentary central section similar to Figure 1 illustrating the feeding means swung upward to permit adjustment of the knives, Figure 8 a plan view of a bed which forms a part of my invention, Figure 9 a side elevation of two machines constructed in accordance with my invention arranged in tandem, Figure 10 a diagrammatic view illustrating the equal inclination of the fly and stationary knives and their shearing action on the stock, Figure 11 a diagrammatic side view of Figure 10 illustrating the knives about to begin their shearing action, Figure 12 a view similar to Figure 11 illustrating the fly knife moved half way in its shearing action, and Figure 13 a similar view showing the completion of the shearing action of the knives.

Briefly my improved stock cutter is composed of a frame having cutting means mounted therein; means for feeding stock to the cutting means mounted to swing on the frame so that they may be swung out of the way to permit access to the cutting means, and discharging means whereby the cut stock is discharged from the machine.

Referring to the drawings, a frame 1 is composed of sections 2 and 3 connected together by spacers 4 bolted to the sections by bolts 5 and tie bolts 6. A bed 7, cast in one piece, includes a pair of bearings 8, a stationary knife support 9 and a cross brace 10. A stationary knife 11 is mounted on an inclined face 12 of support 9 between adjusting screws 13, passing through projections on the support. The face 12 is inclined sidewise and endwise as shown in Figures 1, 11 to 13 and stationary knife 11 mounted thereon is correspondingly inclined. Knife 11 is secured to support 9 by bolts 14 passing through the support and slots in the knife. Fly knives 15 are mounted in a cylinder 16 and so disposed that, when a knife begins to cut, its cutting edge will be inclined in equal degree and in opposite direction to the cutting edge of the stationary knife 11 as clearly shown in Figures 10 to 13. These knives 15 are secured within pockets 17 in cylinder 16 by bolts 18 passing through the cylinder and slots in the knives. Adjusting screws 19 are disposed in one pocket and extend through the body of the cylinder into engagement with the knife 15 in the adjacent pocket so that the knife 15 in one pocket is adjusted from the adjacent pocket. The circumferential width 20 of each pocket is less than the shortest distance between adjacent pockets, thereby preventing an appreciable amount of stock from being forced into the pockets when the cylinder is in operation.

Cylinder 16 is fixed to a shaft 21 rotatable in bearings 8. Fly wheels 22 are mounted on the ends of shaft 21 to prevent distortion in the shaft produced by strains from the knives. A hood 23 is hinged at 24 to brace 10 and extends over the cylinder to serve as a guard. It will be seen that all parts beginning with the reference character 7 and ending with 23 constitute the cutting means and may be removed from frame 1 as a single unit by merely loosening the securing bolts.

The means for feeding stock between the knives includes a feed shaft 25 rotatably in a housing 26 fixed to the frame at 27. A feed table 28, mounted at 29 to swing on housing 26, is provided with a lug 30 which rests on a projection intergral with support 9. The feed table 28 is secured to support 9 by a pivoted bolt 31 swung between a pair of lugs 32 integral with support 9. A pulley 33, mounted on one end of feed shaft 25, is operatively connected with a pulley 34, on shaft 21, by a belt 35. The other end of feed shaft 25 is provided with a pulley 36 operatively connected with a pulley 37, on an eccentric shaft 38, by a belt 39. Eccentric shaft 38 is rotatable in bearings 40 fixed to table 28. Eccentrics 41, fixed to shaft 36, are connected to a pan 42 by eccentric straps 43 and arms 44 which are bolted to brackets 45 secured to the bottom of pan 42. The end 46 of pan 42 is reinforced by a strip 47 and rests on a wearing plate 48 secured to table 28. Rotation of shaft 25 will rotate eccentrics 41 and impart a reciprocating movement to pan 42 which will slide on wearing plate 48. A feed roller 49 is composed of star wheels 50 keyed to a shaft 51 and preferably arranged with the teeth of one staggered relatively to the teeth of the adjacent wheel. Shaft 51 is rotatably mounted in a yoke 52 having its arm 53 mounted to swing at 54 on housing 26. Roller 49 is disposed between the sides of table 28 and directly above wearing plate 48 so that when stock is fed by pan 42 roller 49 will drag it over wearing plate 48 and feed it to the knives. Feed roller 49 receives its movement from feed shaft 25 through a pair of sprockets 55 and 56 connected by a chain 57. It will be seen that the parts beginning with reference character 28 and ending with 57 constitute the feeding means and will swing as a unit on housing 26 as shown in Figure 7 so that access to the knives may be had for adjusting or replacing them.

Shock absorbers 58 are mounted on sections 2 and 3 so that the arms 53 of yoke 52 will rest thereon. The shock absorbers may be of any suitable construction. A preferred form is shown in Figure 6, and includes a base 59 having a bore into which slides a sleeve 60, provided with a cap 61. A spring 62 is interposed between the cap and the base and absorbs the shocks.

The means for discharging the cut stock from the machine includes a guide plate 63 mounted on angles 64 which are bolted to sections 2 and 3. Guide plate 63 is preferably disposed so that its upper edge will be under support 9 and its lower edge directly above a conveyor belt 65. This conveyor belt passes over a roller 66 mounted in bearings 67 fixed to sections 2 and 3. I preferably provide openings 68 in sections 2 and 3 in which bearings 67 are mounted so that roller 66 may be easily removed from the machine for repairs. The conveyor belt 65 may receive its movement directly from a pulley 69 on shaft 21 through suitable power transmitting means, or indirectly through a roller 70 over which conveyor belt 65 passes and a pulley 71 which is fixed to roller 70 and operatively connected with pulley 69 by a belt 72.

In the operation of my improved stock cutter the machines are arranged in tandem as shown in Figure 9 and stock is fed into pan 42 from a conveyor belt, or any suitable means, not shown. Pan 42, being inclined and reciprocated by the eccentrics 41, will force the stock against roller 49 which will receive the stock between its teeth and drag it over wearing plate 48 and force it against cylinder 16 and over stationary knife 11. Cylinder 16, being rotated at about 600 R. P. M., will cause fly knives 15 thereon to rapidly shear the stock as it is fed against the cylinder. The speed at which the narrow pockets 17 pass the fed stock is too great to allow an appreciable amount of the stock to be forced into them, thereby preventing lumps from forming and avoiding heavy cuts and strains on the knives. The knives may be adjusted so that strips of any desired width may be sheared from the stock. The stock as it is sheared by the knives drops down against guide plate 63 which guides it onto conveyor belt 65. Conveyor belt 65 carries the cut stock to any desired place or to another machine to be again cut as shown in Figure 9.

Figure 11 illustrates the near ends of the knives beginning to shear; Figure 12 the centers of the knives shearing, and Figure 13 the far ends of the knives shearing. It will be seen that the near and far ends of the knives are at equal distances from the center of shaft 21 while the centers of the knives, as shown in Figure 12, are slightly nearer the center of shaft 21 than the ends. Thus it is readily seen that by inclining the knives equally in opposite directions as shown in Figure 10, a straight knife may be used on a revolving member to cut the stock as it would be cut by a pair of shears, that is no two points between the knives will cut at the same time.

When it is desired to gain access to the knives for adjustment or repair, bolt 31 is loosened from lugs 32, a hook is inserted in a hole 73 in yoke 52 and the yoke raised so that it will be free of slot 74 in the sides of table 28. The eccentric parts mounted on table 28 will then overbalance the end near the cylinder, which will follow yoke 52 upward into the position shown in Figure 7. The knives may then be conveniently adjusted, or the cutting unit removed as a whole by loosening bolts 75.

By reciprocating pan 42 the feeding means is made automatic. By the use of cutting means which shears the severe strains on the knives are reduced to a minimum. By making the bearings for shaft 21 integral with the stationary knife support the adjustment of the knives will be permanent because there is no connection which may be distorted to disarrange the knives. Placing guide plate 63 as above set forth prevents the cut stock from getting caught around the shaft of roller 66 and avoids danger of fire by friction.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A stock cutter including cutting means; a feed table for guiding the stock into the cutting means; a wearing plate on the table; a feed roller disposed above the wearing plate; a pan mounted to reciprocate toward the roller and having its end resting on the wearing plate; an eccentric shaft mounted on the table; means on the eccentric shaft for reciprocating the pan, and means for imparting movement to the cutting means, the roller and the shaft.

2. A stock cutter including a frame; cutting means on the frame; a tubular housing on the frame; a feed shaft rotatable in the housing; a feed table mounted to swing on the housing, and means for feeding stock to the cutting means.

3. A stock cutter including a frame; cutting means on the frame; a tubular housing on the frame; a feed shaft rotatable in the housing; a feed table mounted to swing on the housing, and means mounted on the table for feeding stock to the cutting means.

4. A stock cutter including a frame; cutting means on the frame; a tubular housing on the frame; a feed shaft rotatable in the housing; a table for guiding stock to the cutting means; a yoke mounted to swing on the housing; a feed roller rotatable in the yoke and disposed above the table, and means for feeding stock to the roller.

5. A stock cutter including a frame; cutting means on the frame; a tubular housing on the frame; a feed shaft rotatable in the housing; a feed table mounted to swing on the housing; a yoke mounted to swing on the housing; a feed roller rotatable in the yoke and disposed above the feed table, and means for feeding stock to the roller.

6. A stock cutter including a frame; cutting means on the frame; a tubular housing on the frame; a feed shaft rotatable in the housing; a feed table mounted to swing on the housing; a yoke mounted to swing on the housing; a feed roller rotatable in the yoke and disposed above the table; a pan mounted to reciprocate toward the roller; an eccentric shaft mounted on the table and operatively connected with the feed shaft, and means on the eccentric shaft for reciprocating the pan.

7. A stock cutter including a frame; cutting means on the frame; shock-absorbing means on the frame; a yoke mounted to swing on the frame and resting on the shock-absorbing means; a feed table for guiding the stock to the cutting means; a feed roller rotatable in the yoke and disposed above the table, and means for feeding the stock to the roller.

8. A stock cutter including a frame; a cylinder rotatable in the frame; fly knives mounted on the cylinder and inclined in one direction from its axis; a stationary knife mounted on the frame, inclined an equal degree in the opposite direction from the cylinder axis and co-operating with the fly knives to shear the stock, and means for feeding stock to the knives.

9. A stock cutter including a frame; a cylinder rotatable in the frame; straight fly knives mounted on the cylinder and inclined in one direction from its axis; a straight stationary knife mounted on the frame, inclined an equal degree in the opposite direction from the cylinder axis and co-operating with the fly knives to shear the stock, and means for feeding stock to the knives.

10. A stock cutter including a frame; a cylinder rotatable in the frame and provided with pockets; fly knives; means for securing the fly knives in the pockets; screws passing from one pocket to the adjacent pocket for adjusting the knives; a stationary knife mounted on the frame and co-operating with the fly knives to cut the stock, and means for feeding stock to the knives.

In testimony whereof I have signed my name to this specification in the presence of two subscribing witnesses.

JAMES BERTWELL WHITE.

Witnesses:
HARRY B. STRADLEY, Jr.,
MARY E. HANEY.